(12) United States Patent
Chinomi

(10) Patent No.: US 11,100,798 B2
(45) Date of Patent: Aug. 24, 2021

(54) VEHICLE MANAGEMENT SYSTEM AND VEHICLE MANAGEMENT METHOD

(71) Applicant: Nissan Motor Co., Ltd., Kanagawa (JP)

(72) Inventor: Satoshi Chinomi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 282 days.

(21) Appl. No.: 15/027,837

(22) PCT Filed: Sep. 29, 2014

(86) PCT No.: PCT/JP2014/075881
§ 371 (c)(1),
(2) Date: Apr. 7, 2016

(87) PCT Pub. No.: WO2015/053122
PCT Pub. Date: Apr. 16, 2015

(65) Prior Publication Data
US 2016/0240083 A1    Aug. 18, 2016

(30) Foreign Application Priority Data
Oct. 10, 2013 (JP) .............................. JP2013-212485

(51) Int. Cl.
| G08G 1/14 | (2006.01) |
| H04W 4/44 | (2018.01) |
| G08G 1/00 | (2006.01) |
| G06Q 10/02 | (2012.01) |

(52) U.S. Cl.
CPC ............. *G08G 1/144* (2013.01); *G06Q 10/02* (2013.01); *G08G 1/146* (2013.01); *G08G 1/205* (2013.01); *H04W 4/44* (2018.02)

(58) Field of Classification Search
None
See application file for complete search history.

(56) References Cited

U.S. PATENT DOCUMENTS

| 2004/0176969 A1 | 9/2004 | Fujinuma |
| 2005/0080752 A1 | 4/2005 | Uehara et al. |

(Continued)

FOREIGN PATENT DOCUMENTS

| EP | 2082386 A1 | 7/2009 |
| JP | 2002-279580 A | 9/2002 |

(Continued)

OTHER PUBLICATIONS

R. Lu, X. Lin, H. Zhu and X. Shen, "An Intelligent Secure and Privacy-Preserving Parking Scheme Through Vehicular Communications," in IEEE Transactions on Vehicular Technology, vol. 59, No. 6, pp. 2772-2785, Jul. 2010, doi: 10.1109/TVT.2010.2049390. (Year: 2010).*

(Continued)

*Primary Examiner* — Scott M Tungate
(74) *Attorney, Agent, or Firm* — Osha Bergman Watanabe & Burton LLP

(57) ABSTRACT

A vehicle management system for managing vehicles used by users has a usage managing unit configured to accept a user's reservation for use of one of the vehicles, set returnable spaces among parking spaces to be managed, the returnable space being the parking space to which a reserved vehicle can be returned after using the reserved vehicle, and set a planned return space to be a destination for the reserved vehicle among the returnable spaces, and a usage determining unit configured to determine whether or not the use of the reserved vehicle is started. The usage managing unit is configured to set a vacant parking space to the returnable space when the usage determining unit determines that the use of the reserved vehicle is started. The vacant parking space is the parking space in which the reserved vehicle is parked at the time of departure.

7 Claims, 9 Drawing Sheets

(56) References Cited

U.S. PATENT DOCUMENTS

| | | | | |
|---|---|---|---|---|
| 2011/0241898 A1* | 10/2011 | Busch | ............ | G08G 1/14 |
| | | | | 340/932.2 |
| 2012/0092190 A1 | 4/2012 | Stefik et al. | | |
| 2012/0095792 A1 | 4/2012 | Stefik et al. | | |
| 2012/0095812 A1* | 4/2012 | Stefik | ............ | G06Q 10/02 |
| | | | | 705/13 |
| 2013/0290045 A1* | 10/2013 | Levy | ............ | G07B 15/02 |
| | | | | 705/5 |
| 2014/0232569 A1* | 8/2014 | Skinder | ............ | G08G 1/144 |
| | | | | 340/989 |
| 2015/0348179 A1* | 12/2015 | Kamisawa | ............ | G08G 1/205 |
| | | | | 705/5 |

FOREIGN PATENT DOCUMENTS

| | | |
|---|---|---|
| JP | 2004178385 A | 6/2004 |
| JP | 2010-086123 A | 4/2010 |
| JP | 2011-128987 A | 6/2011 |
| JP | 2012160016 A | 8/2012 |
| JP | 2013-191004 A | 9/2013 |
| WO | 2004/097704 A1 | 11/2004 |

OTHER PUBLICATIONS

Extended European Search Report in counterpart European Application No. 14 85 1844.2 dated Sep. 30, 2016 (7 pages).
Minutes of the Oral Proceedings in counterpart European Patent Application No. 14851844.2 dated Apr. 29, 2020 (40 pages).

\* cited by examiner

VEHICLE MANAGEMENT SYSTEM AND VEHICLE MANAGEMENT METHOD

CROSS-REFERENCE TO RELATED APPLICATIONS

This application is a national stage application of PCT/JP2014/075881 filed Sep. 29, 2014, which claims priority to Japanese Patent Application No. 2013-212485 filed Oct. 10, 2013, the contents of which are incorporated herein by reference in their entirety.

TECHNICAL FIELD

The present invention relates to a vehicle management system and a vehicle management method.

RELATED ART

A vehicle sharing system is known which manages vehicles in response to reservations from users and regulates return spaces to which the vehicles are to be returned after being used by the users. This vehicle sharing system acquires positional information of a vehicle on the basis of GPS signals, and determines that the vehicle has been returned only when the acquired positional information of the vehicle coincides with positional information of a predetermined return space for the vehicle (Patent Document 1).

[Patent Document 1] JP 2011-128987 A

SUMMARY

However, after the use of a vehicle is started, the above vehicle sharing system does not take into account how the vehicle sharing system treats the parking space in which the vehicle is parked. Thus, occupation time for the parking space increases.

A vehicle management system according to one or more embodiments of the present invention reduces the occupation time for a parking space.

One or more embodiments of the present invention sets returnable spaces. More specifically, returnable spaces are set among parking spaces. A planned return space to be a destination for the reserved vehicle is set among the returnable spaces. A vacant parking space is set to the returnable space when determining that the use of the reserved vehicle is started. The returnable space is a parking space to which the user can return a reserved vehicle after using the reserved vehicle. The vacant parking space is the parking space in which the reserved vehicle is parked at the time of departure.

According to one or more embodiments of the present invention, when the use of the reserved vehicle is started, the vacant parking space comes to be a state in which the parking space can be set to a planned return space for another vehicle. This can result in reducing the occupation time for the parking space.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
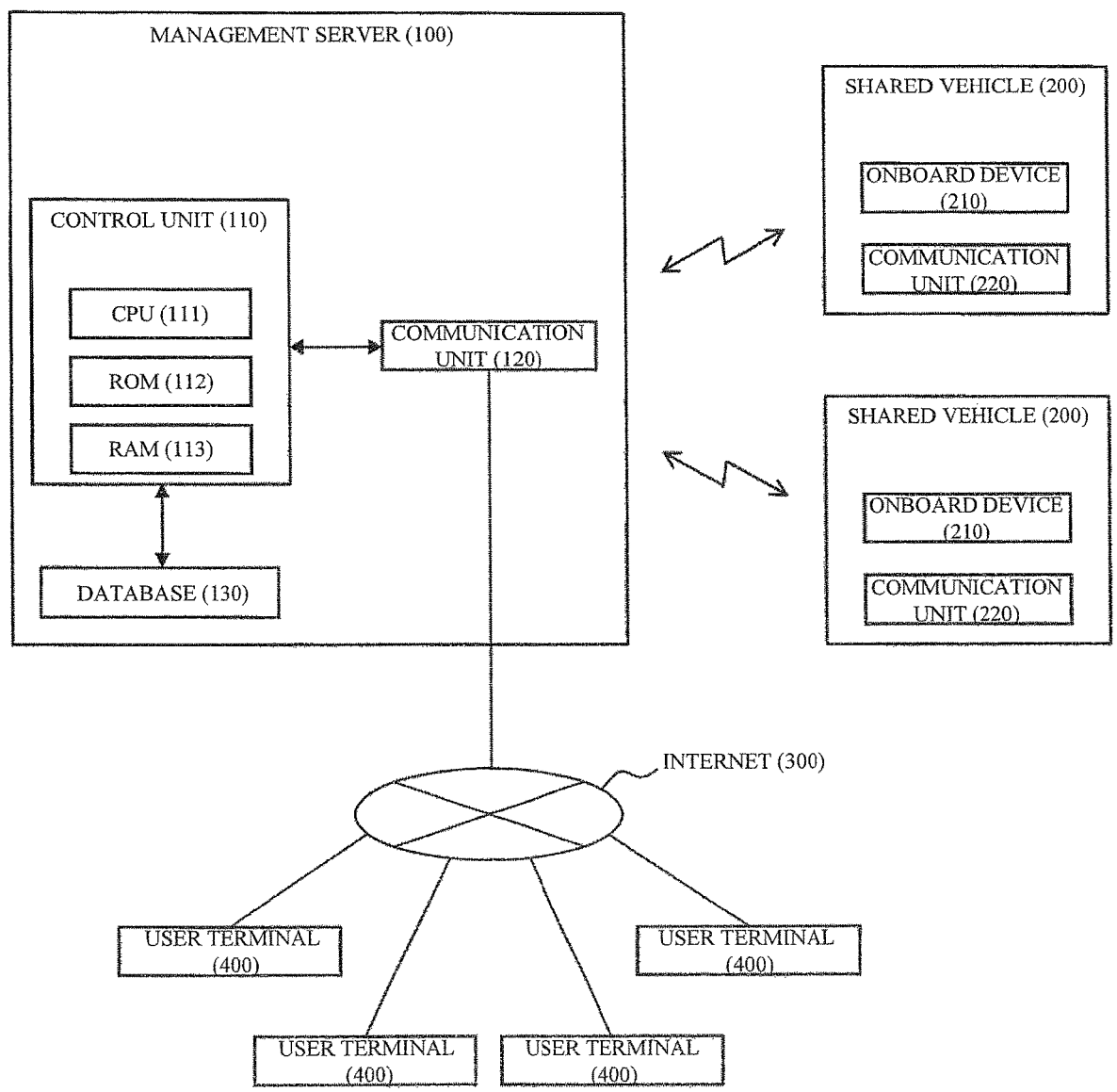
FIG. 1 is a configuration diagram of a vehicle sharing system according to one or more embodiments of the present invention.

FIG. 1 is the block configuration diagram of a vehicle sharing system according to one or more embodiments of the present invention. As illustrated in FIG. 1, the vehicle sharing system according to one or more embodiments of the present invention comprises: a management server 100; shared vehicles 200 provided for vehicle sharing service; and user terminals 400 that are communicable with the vehicle management server 100 through the Internet 300. In FIG. 1, while only two shared vehicles 200 are illustrated, the vehicle sharing system according to one or more embodiments of the present invention is configured by many shared vehicles 200. In the vehicle sharing system according to one or more embodiments of the present invention, many shared vehicles 200 are parked in predetermined parking spaces disposed at various places, and specified users can select and use the shared vehicles 200 parked in desired parking spaces.

As illustrated in FIG. 1, the shared vehicles 200 can communicate with the management server 100, and each of the shared vehicles 200 includes an onboard device 210 and a communication unit 220. The onboard device 210 transmits information of the shared vehicle 200, such as information of use start time and use end time, information of a traveling distance, information of the vehicle position, information of the vehicle speed, information of the remaining battery charge, and information of ON/OFF of the vehicle power switch, from the communication unit 220 to a communication unit 120 included in the management server 100 through wireless communication. The communication unit 220 receives information transmitted by signals from the management server 100.

The onboard device 210 can acquire the information of the vehicle position as below. For example, the onboard device 210 can acquire real-time positional information of each shared vehicle 200 by receiving electric waves transmitted from positioning satellites using a global positioning system (GPS) for every predetermined time.

The user terminals 400 are terminals owned by specified users using the vehicle sharing system according to one or more embodiments of the present invention. The user terminals 400 can communicate with the communication unit 120 through the Internet 300. The communication unit 120 is included in the management server 100. In the vehicle sharing system according to one or more embodiments of the present invention, each user can make a use request for using a shared vehicle 200 with the user terminal 400.

Here, the use request for a shared vehicle 200 may be a request for an immediate use or a request for a reservation. The request for an immediate use is a request for using a shared vehicle 200 immediately after the user's request for the use. The request for a reservation is a request for using a shared vehicle 200 in the future.

In addition, in the vehicle sharing system according to one or more embodiments of the present invention, when making a use request for a shared vehicle 200 using the user terminal 400, the user performs setting of a planned return space. Here, the planned return space is a space to which the user returns the shared vehicle 200 after use.

As examples of the user terminals 400, there are various mobile terminals such as cellular phones and PDAs in addition to personal computers. When the user terminal 400 is a cellular phone, the user terminal 400 may read the vehicle information which is transmitted from the communication unit 120 through wireless communication based on various wireless device standards, and the user terminal 400 may transmit the vehicle information and other necessary information to the management server 100. In FIG. 1, for example, while four terminals are illustrated as the user terminals 400, both the number of user terminals 400 and the number of users using the vehicle sharing system are not particularly limited.

The management server 100 includes a control unit 110, a communication unit 120 and a database 130.

The communication unit 120 is a device used for communicating with the communication unit 220 included in each shared vehicle 200 through wireless communication. The communication unit 120 is a device for communicating with the user terminal 400 owned by each user through the Internet 300. The communication unit 120 acquires the information of use start time and use end time, the information of a traveling distance, the information of the vehicle position, and the like related to the shared vehicle 200 from the onboard device 210 through wireless communication. The communication unit 120 also acquires the information of a user's request for using a shared vehicle 200, the information of a planned return space selected by the user, and the like from the user terminal 400. Examples of the information of the user's request include information of a vehicle desired for use, use history of the service, member registration information, and the like.

The database 130 is a storage device used for storing use acceptance information, planned return space information, positional information of parking spaces during parking, and the like for each shared vehicle 200. Here, each of the use acceptance information and the planned return space information is information that is generated for each shared vehicle 200 on the basis of information transmitted from the user terminal 400 when the user makes a use request for a shared vehicle 200 and selects an available vehicle and a planned return space through the user terminal 400. The positional information of parking spaces during parking include information of locations of parking spaces in which vehicles that are not reserved are parked and information of locations of parking spaces in which vehicles that are reserved but before start of use are parked. When users of the vehicle sharing system are limited to the members, the database 130 also stores information of the registered members, identification information of the user terminals 400 registered by members, and other necessary information.

Figure 2:
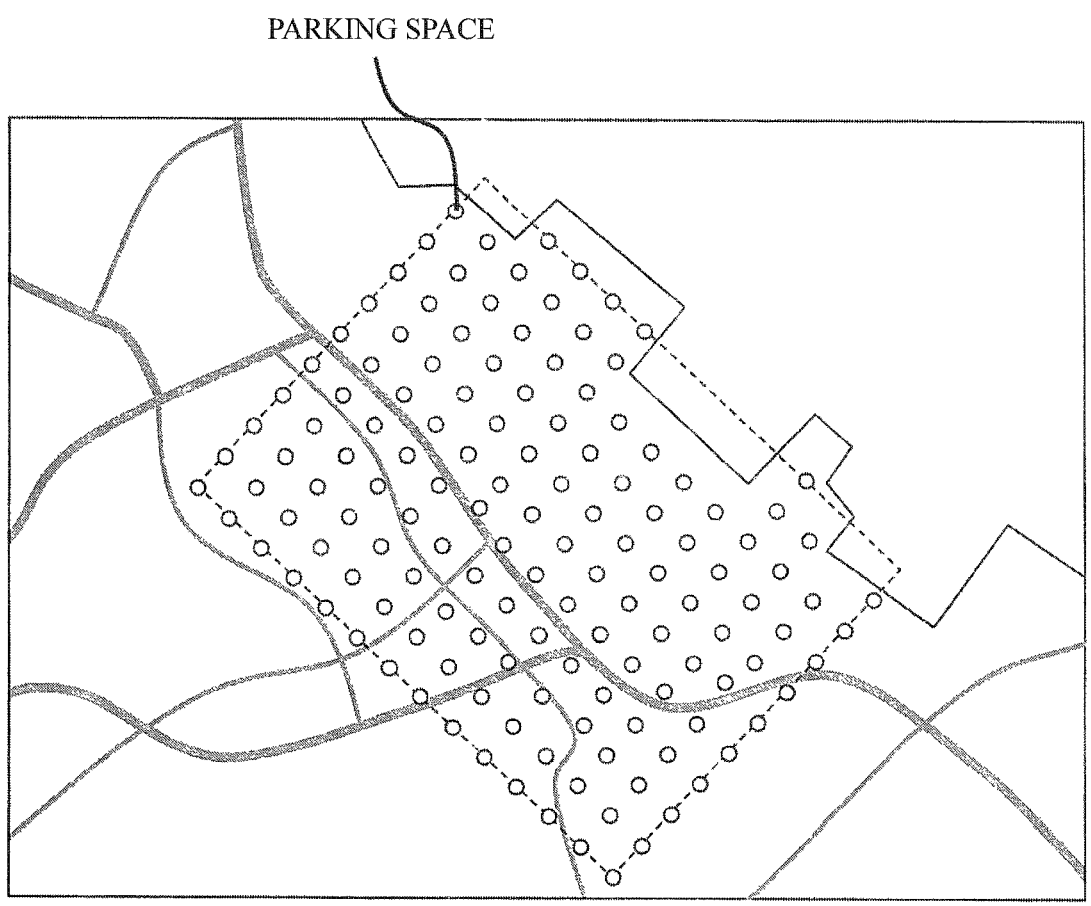
FIG. 2 is a diagram illustrating an example in which parking spaces are arranged in a predetermined district.

In addition, in the database 130, information of parking spaces used for parking the shared vehicles 200 is stored. For example, as illustrated in FIG. 2, in the database 130, positional information of parking spaces disposed in a predetermined district surrounded by broken lines on the map are stored. In the vehicle sharing system according to one or more embodiments of the present invention, such parking spaces are parking lots used for parking the shared vehicles 200, and the shared vehicles 200 are parked in some of the parking spaces. As a user makes a use request through the user terminal 400, a desired shared vehicle 200 can be used.

The control unit 110 of the management server 100, as illustrated in FIG. 1, includes: a read only memory (ROM) 112 in which various programs are stored; a central processing unit (CPU) 111 as an operation circuit executing a program stored in the ROM 112; and a random access memory (RAM) 113 serving as an accessible memory device.

In order to manage the vehicle sharing system according to one or more embodiments of the present invention, the control unit 110 has a vehicle setting function to set an available vehicle, a return space setting function, a reservation managing function, an authenticating function when using a vehicle, a return determining function, and a return permitting function.

Figure 3:
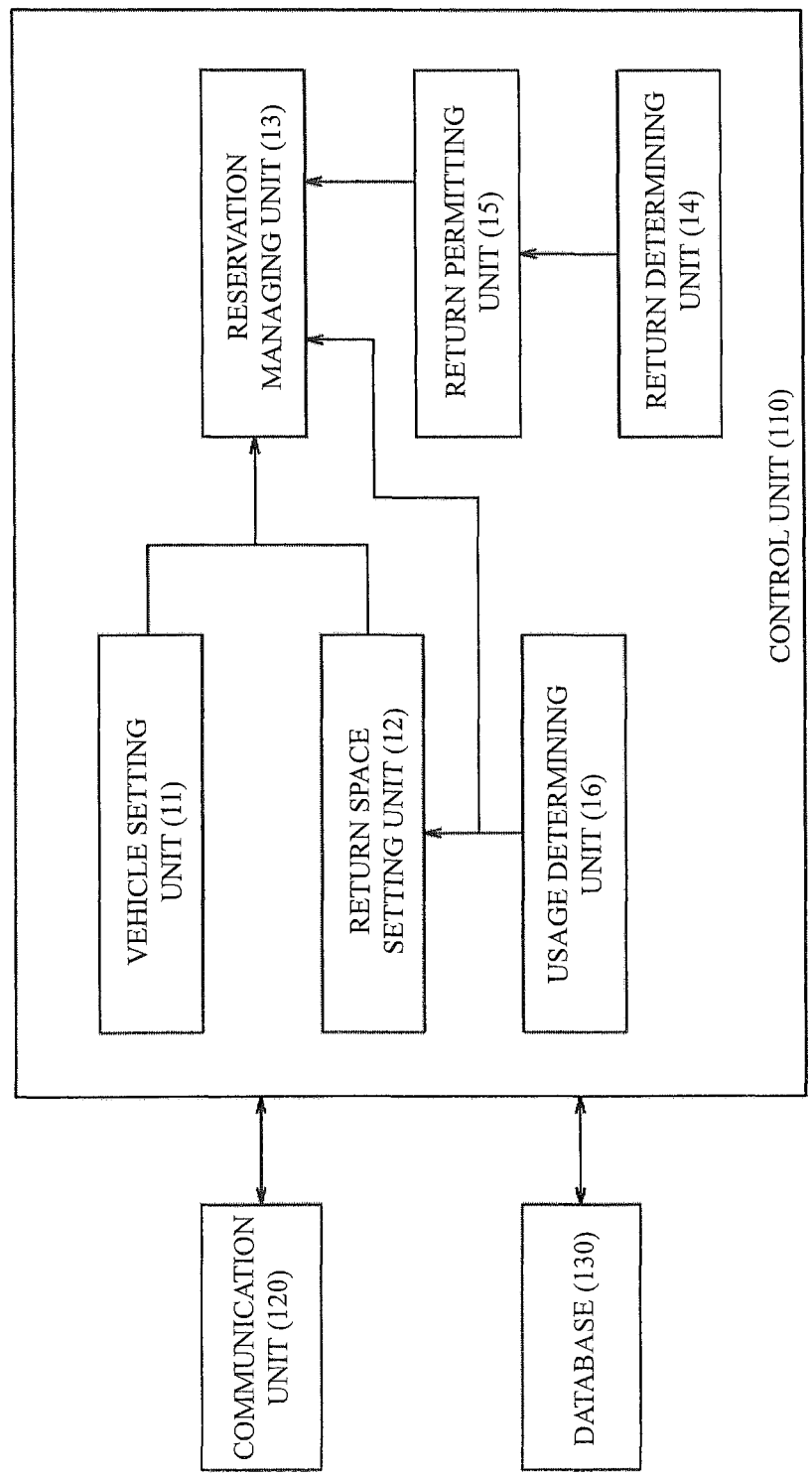
FIG. 3 is a block diagram illustrating a configuration of a control unit.

The control unit 110 can execute each of the functions described above by cooperative processes of software used for realizing each of the functions and the hardware described above. As illustrated in FIG. 3, the control unit 110 has a vehicle setting unit 11, a return space setting unit 12, a reservation managing unit 13, a return determining unit 14, a return permitting unit 15, and a usage determining unit 16, as functional blocks for making the above functions.

Hereinafter, each function realized by the control unit 110 of the management server 100 will be described with reference to FIG. 3. Control at the side of the vehicles will also be described as necessary. FIG. 3 is a block diagram illustrating functional blocks of the control unit 110.

First, the control unit 110 accepts a request for use of a vehicle from a user as a stage prior to making the function of each functional block shown in FIG. 3. Specifically, when the user operates the user terminal 400 to make a use request for a shared vehicle 200, the control unit 110 accepts the use request on the basis of the information of the use request transmitted from the user terminal 400.

Subsequently, receiving the information of the use request for a shared vehicle 200 through the communication unit 120, the vehicle setting unit 11 confirms usage situation of the shared vehicles 200 which are managed by the control unit 110. The vehicle setting unit 11 manages the usage situation of a plurality of shared vehicles 200 for each port. At least one parking space is provided in a port. Each parking space is a space to which the user returns the vehicle after using the vehicle. Each parking space is managed by the vehicle sharing system of one or more embodiments of the present invention. One parking space may be provided in a port, or two or more parking spaces may also be provided in a port. These ports are provided at a plurality of locations and each port can be a departure place and a destination of a vehicle.

The vehicle setting unit 11 manages a usage state of each shared vehicle 200 to be managed. Examples of the usage state of each shared vehicle 200 include at least three states, i.e. a state in which the vehicle is currently used, a state in which the vehicle has been reserved, and a state in which the vehicle is not reserved. Examples of the usage state may further include a state in which the use and reservation of a vehicle are not accepted, such as a case in which the battery capacity of the vehicle is not sufficient, for example.

When a request for use is made by a user, the vehicle setting unit 11 sets one or more vehicles that are not reserved (unreserved vehicles) among the shared vehicles 200, to available vehicles.

The vehicle setting unit 11 makes a list of available vehicles and then uses the communication unit 120 so as to transmit the list of available vehicles to the user who made the request for use. Receiving the list, the user can confirm the available vehicles and parking positions of the available vehicles by watching the list on a display screen of the user terminal 400. In addition, the vehicle setting unit 11 transmits information indicating that the available vehicles have been set, to the reservation managing unit 13.

Receiving the information of the use request for a shared vehicle 200 through the communication unit 120, the return space setting unit 12 confirms usage situation of parking spaces that are managed by the control unit 110.

Examples of the usage state of each parking space include three states, i.e. a state in which a vehicle is currently parked in the parking space, a state in which the parking space has been reserved as a planned space of arrival, and a state in which the parking space is not reserved. Examples of the usage state may further include a state in which the parking and reservation are not accepted, such as a case in which paving work is performed for the parking space.

When a request for use is made by a user, the return space setting unit 12 sets one or more unreserved parking spaces among the managed parking spaces, to returnable spaces. No vehicles are parked in the unreserved parking spaces and planned return spaces (destinations) for vehicles are not set in the unreserved parking spaces.

The return space setting unit 12 makes a list of returnable spaces and then uses the communication unit 120 to transmit the list of returnable spaces to the user who makes the request for use. Receiving the list, the user can confirm the returnable spaces and locations of the returnable spaces by watching the list on a display screen of the user terminal 400. In addition, the return space setting unit 12 transmits information indicating that the returnable spaces have been set, to the reservation managing unit 13.

The reservation managing unit 13 performs acceptance of use of a vehicle by receiving a signal indicating a request for use from a user through the communication unit 120. Performing the acceptance of use, the reservation managing unit 13 determines whether or not available vehicles are set by the vehicle setting unit 11 and whether or not returnable spaces are set by the return space setting unit 12. When no available vehicles are set or when no returnable spaces are set, the reservation managing unit 13 determines that the reservation of a vehicle cannot be made, and the reservation managing unit 13 transmits a signal indicating that the reservation cannot be made (a signal indicating that the service is not available) to the user through the communication unit 120.

On the other hand, when one or more available vehicles are set and when one or more returnable spaces are set, the reservation managing unit 13 determines a state in which the reservation of an available vehicle can be made. At this moment, the reservation managing unit 13 may not necessarily transmit a signal indicating that reservation can be made to the user because the list of available vehicles has been transmitted to the user.

When the user selects a reserved vehicle from the list of available vehicles, the user terminal 400 transmits information of the reserved vehicle which is selected, to the communication unit 120. The vehicle setting unit 11 sets the reserved vehicle from the list of available vehicles and transmits identification information of the reserved vehicle to the reservation managing unit 13. In addition, when the user selects a planned return space from the list of returnable spaces, the user terminal 400 transmits a signal indicating the planned return space which is selected, to the communication unit 120. The return space setting unit 12 sets a planned return space from the list of returnable spaces. The return space setting unit 12 then transmits identification information of the planned return space which is set, to the reservation managing unit 13.

After the vehicle setting unit 11 sets the reserved vehicle and the return space setting unit 12 sets the planned return space, the reservation managing unit 13 fixes the reservation and transmits the fixed information to the user. In addition, the reservation managing unit 13 stores the fixed reservation information in the database 130 while associating the fixed reservation information with the identification information of the user who makes the reservation. The reservation information includes identification information of the reserved vehicle, identification information of the planned return space, information of the use start time and planned return time, and other necessary information. The identification information of the user may be registration information of the user or may also be identification information of the user terminal 400 used by the user when making the reservation. In addition, when fixing the reservation, the reservation managing unit 13 transmits the identification information of the user and the reservation information to the communication unit 220 of the reserved vehicle.

Receiving signals including the identification information of the user and the reservation information through the communication unit 220, the onboard device 210 records the information in a memory.

Next, functions when starting the use of the vehicle will be described.

Each shared vehicle 200 has a communication function capable of communicating with the user terminal 400. The communication is performed through wireless communication using the communication unit 220 of the shared vehicle 200. In one or more embodiments of the present invention, each shared vehicle 200 may be provided with a reader. The user may hold the user terminal 400 over the reader so as to communicate between the shared vehicle 200 and the user terminal 400. When using the reserved vehicle, the user operates the user terminal 400 to perform communication with the onboard device 210 of the shared vehicle 200. The user terminal 400 transmits the identification information of the terminal or the identification information of the user to the vehicle.

The onboard device 210 is provided with an authenticating function for determining permission of use. When receiving the identification information of the user from the user terminal 400, the onboard device 210 determines whether or not the received identification information matches the identification information recorded in a memory. When the received identification information matches the identification information in the memory, the onboard device 210 permits the user to use the vehicle and opens the lock mechanism for the doors. On the other hand, when the received identification information does not match the identification information in the memory, the onboard device 210 does not open the lock mechanism for the doors and gives notice indicating that the use is not permitted. The onboard device 210 gives the notice to the user by sounding an alarm tone or the like.

After opening the lock mechanism for the doors, the onboard device 210 transmits a signal indicating that the use of the vehicle will be started, to the communication unit 120 of the management server 100.

The usage determining unit 16 determines whether or not the use of the reserved vehicle is started, in accordance with whether or not the communication unit 120 receives a signal indicating that the use of the vehicle will be started. When the communication unit 120 receives a signal indicating that the use of the vehicle will be started, the usage determining unit 16 determines that the use of the reserved vehicle is started, and transmits the identification information of the reserved vehicle to the return space setting unit 12 and reservation managing unit 13. The identification information transmitted from the usage determining unit 16 indicates an identification of the reserved vehicle used by the user when starting the use of the reserved vehicle.

When acquiring the identification information of the reserved vehicle from the usage determining unit 16, the reservation managing unit 13 compares the acquired identification information with the identification information of the shared vehicles 200 stored in the database 130 so as to perceive the vehicle to be used. In addition, the reservation managing unit 13 acquires the positional information of the shared vehicles 200 so as to manage the positions of the vehicles which are being used. The positional information of the shared vehicles 200 is acquired by using such as GPS. In this way, the reservation managing unit 13 manages the vehicles which are being used, in addition to the above reservation management for the shared vehicles 200.

When acquiring the identification information of the reserved vehicle from the usage determining unit 16, the return space setting unit 12 refers to the information recorded in the database 130 so as to specify a vacant parking space. The vacant parking space is the parking space in which the reserved vehicle is parked at the time of departure. The database 130 stores the identification information of the shared vehicles 200 and the positional information of the parking spaces in which the shared vehicles 200 are parked. The identification information and the positional information are associated with each other in the database. The return space setting unit 12 specifies a shared vehicle 200 that matches the received identification information of the reserved vehicle. The return space setting unit 12 specifies the positional information of a parking space that corresponds to the identification information of the specified shared vehicle 200, as the vacant parking space.

In addition, the return space setting unit 12 sets the vacant parking space to a returnable space. After the use of the reserved vehicle is started and the reserved vehicle travels from the parking space, the parking space in which the reserved vehicle is parked is a vacant space. To reduce the occupation time of the parking space, this vacant space is opened for other vehicles so that the vacant space can be set to a planned return space for another vehicle when the reserved vehicle is being used.

Accordingly, when the usage determining unit 16 determines that the use of the reserved vehicle is started, the return space setting unit 12 sets the parking space in which the reserved vehicle is parked at the time of departure, to a returnable space. After the parking space to a returnable space, a user using another shared vehicle 200 can select the parking space to a planned return space. That is, the parking space in which the reserved vehicle is parked is opened after the use of the reserved vehicle is started, and the occupation time for the parking space can be reduced.

Next, the return determining function of the return determining unit 14 will be described. When a user returns a shared vehicle (reserved vehicle) 200 after using the shared vehicle, the return determining unit 14 determines whether or not the shared vehicle 200 is returned to a planned return space which has been set. More specifically, first, the return determining unit 14 transmits a command to the onboard device 210 of the returned shared vehicle 200 so as to acquire the positional information of the shared vehicle 200. In addition, the return determining unit 14 acquires the planned return space information for the returned shared vehicle 200 by extracting the planned return space information from the information stored in the database 130. Then, the return determining unit 14 compares the positional information obtained of the shared vehicle 200 with the planned return space information. The return determining unit 14 determines that the shared vehicle 200 has been returned to the planned returned space when the position of the shared vehicle 200 is located at the planned return space.

Next, the return permitting function of the return permitting unit 15 will be described. When determining that the shared vehicle 200 has been returned to the planned return space, the return permitting unit 15 permits the user's return of the shared vehicle 200 and notifies the user of the completion of returning the shared vehicle 200 through the user terminal 400. The process of returning the shared vehicle 200 is thus completed.

As above, in the vehicle sharing system according to one or more embodiments of the present invention, a request for using the shared vehicle 200 and the setting of a planned return space are made by the user. Then, the process of returning the shared vehicle 200 is executed after the user uses the shared vehicle 200.

Figure 4:
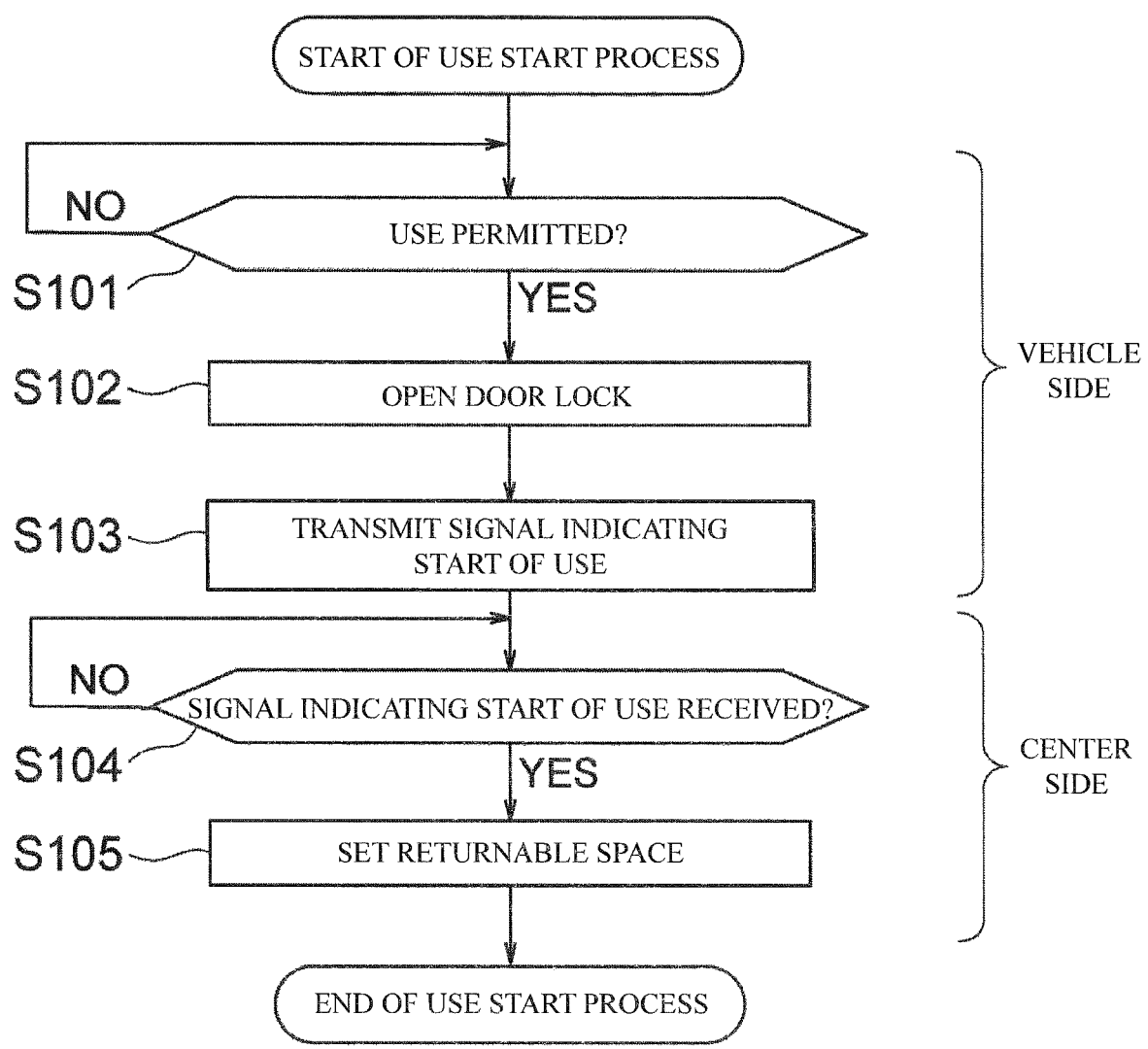
FIG. 4 is a flowchart illustrating a process executed when starting the use of a vehicle in one or more embodiments of the present invention.

Next, the process according to one or more embodiments of the present invention will be described. FIG. 4 is a flowchart that illustrates an example of the process executed when starting the use of a shared vehicle 200 in one or more embodiments of the present invention. In the processes of steps S101 to S105, the processes of steps S101 to S103 represent the processes executed in the shared vehicle 200 while the processes of steps S104 and S105 represent processes executed in the server.

In step S101, the onboard device 210 of a shared vehicle 200 executes, through the user terminal 400, authentication of a user for using the vehicle sharing system according to one or more embodiments of the present invention. The user operates the user terminal 400 owned by the user and transmits information for the use from the user terminal 400 to the onboard device 210 of the shared vehicle 200. The onboard device 210 executes authentication on the basis of the information transmitted from the user terminal 400. When the use of the shared vehicle is permitted as a result of the authentication, the process proceeds to step S102. When the use of the shared vehicle is not permitted as a result of the authentication, or when the information for the use is not received from the user terminal 400, the process waits in step S101.

In step S102, the onboard device 210 opens the lock mechanism for the doors of the shared vehicle 200. In step S103, the onboard device 210 transmits a signal indicating the start of use of the shared vehicle 200 to the management server 100 through the communication unit 220.

In step S104, the control unit 110 of the management server 100 uses the usage determining unit 16 to determine whether or not the communication unit 120 receives the signal indicating the start of use of the shared vehicle. When the usage determining unit 16 receives the signal indicating the start of use of the shared vehicle, the process of the usage determining unit 16 proceeds to step S105 while the usage determining unit 16 determining that the use of the shared vehicle (reserved vehicle) 200 is started. When the usage determining unit 16 does not receive the signal indicating the start of use of the shared vehicle, the process of the usage determining unit 16 waits in step S104 while the usage determining unit 16 determining that the use of the shared vehicle (reserved vehicle) 200 is not started.

In step S105, the control unit 110 of the management server 100 uses the return space setting unit 12 to acquire the information of the shared vehicle 200 from the usage determining unit 16. The acquired information indicates information of the shared vehicle 200 used by the user when starting the use of the shared vehicle 200. The return space setting unit 12 sets the parking space in which the shared vehicle is parked to a returnable space.

As above, in one or more embodiments of the present invention, the vehicle management system accepts a user's reservation for use of a vehicle and sets returnable spaces among parking spaces. The returnable spaces are parking spaces to which a reserved vehicle can be returned after using the reserved vehicle. The vehicle management system sets a planned return space to be a destination for the reserved vehicle among the returnable spaces. The vehicle management system determines that the use of the reserved vehicle is started. In addition, in one or more embodiments of the present invention, the vehicle management system sets a vacant parking space to the returnable space when determining that the use of the reserved vehicle is started. The vacant parking space is the parking space in which the reserved vehicle is parked at the time of departure. In this way, when the use of the reserved vehicle is started, the vacant parking space is set to the returnable space so that another vehicle can be returned to the returnable space. It is possible to reduce the occupation time for the parking space.

Moreover, in one or more embodiments of the present invention, the vehicle management system determines that the use of the reserved vehicle is started when receiving a signal indicating the start of use of the reserved vehicle from the user terminal 400 or the reserved vehicle. In this way, the management server can perceive the timing when the use of the reserved vehicle is started. It is possible to reduce the occupation time for the parking space.

In one or more embodiments of the present invention, the user terminal 400 may read the information indicating the start of use of the reserved vehicle from the communication unit 220, and the user terminal 400 may transmit the information to the management server 100.

In one or more embodiments of the present invention, after a predetermined time has passed since receiving a signal indicating the start of use of the reserved vehicle, the return space setting unit 12 may set the vacant parking space to a returnable space. The time elapsed from the time of receiving the signal is measured using a timer. The predetermined time is set so that the return space setting unit 12 can determine that the vehicle travels from the parking space after receiving the signal. The predetermined time may also be set as a longer period of time than a required period. The required period is a period which is ordinarily required for the vehicle to travel after the user gets in the vehicle.

Figure 5:
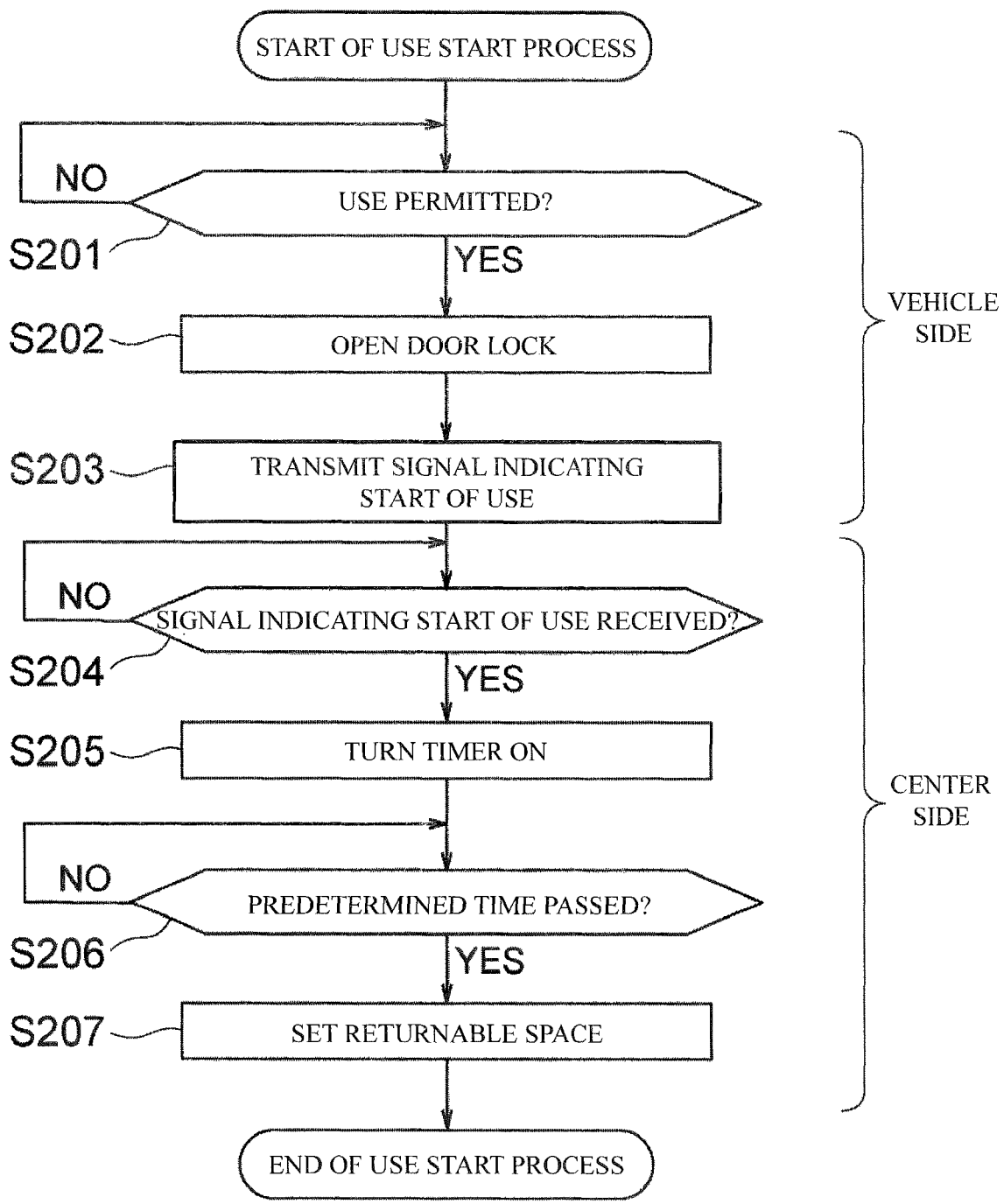
FIG. 5 is a flowchart illustrating a process executed when starting the use of a vehicle in one or more embodiments of the present invention.

The process according to the modified example will be described below. FIG. 5 is a flowchart that illustrates an example of the process executed when starting the use of a shared vehicle 200 in the modified example. In the processes of steps S201 to S207, the processes of steps S201 to S203 represent the processes executed in the shared vehicle 200 while the processes of steps S204 to S207 represent the processes executed in the server.

The processes of steps S201 to S203 are similar to the processes of the above steps S101 to S103 (see FIG. 4), and the description will be omitted.

In step S204, the control unit 110 of the management server 100 uses the usage determining unit 16 to determine whether or not the communication unit 120 receives the signal indicating the start of use of the shared vehicle. When the communication unit 120 receives the signal indicating the start of use of the shared vehicle, the process proceeds to step S205. When the communication unit 120 does not receive the signal indicating the start of use of the shared vehicle, the process of the usage determining unit 16 waits in step S204 while the communication unit 120 determining that the use of the shared vehicle (reserved vehicle) 200 is not started.

In step S205, the control unit 110 of the management server 100 turns on a timer at the time of receiving a signal indicating the start of use of the reserved vehicle. In step S206, the control unit 110 uses the usage determining unit 16 to determine, on the basis of the measured time by the timer, whether or not a predetermined time has passed since receiving the signal indicating the start of use of the reserved vehicle. When the predetermined time has passed, the process of the usage determining unit 16 proceeds to step S207 while the usage determining unit 16 determining that the use of the shared vehicle (reserved vehicle) 200 is started. When the predetermined time has not passed, the process of the usage determining unit 16 waits in step S206 while the usage determining unit 16 determines that the use of the shared vehicle (reserved vehicle) 200 is not started.

In step S207, the control unit 110 of the management server 100 uses the return space setting unit 12 to acquire the information of the shared vehicle 200 from the usage determining unit 16. The acquired information indicates information of the shared vehicle 200 used by the user when starting the use of the shared vehicle 200. The return space setting unit 12 sets the parking space in which the shared vehicle 200 is parked to a returnable space.

The above vehicle setting unit 11, return space setting unit 12 and reservation managing unit 13 correspond to a "usage managing unit" in one or more embodiments of the present invention, the above usage determining unit 16 corresponds to a "usage determining unit" in one or more embodiments of the present invention, and the above return determining unit 14 corresponds to a "return determining unit" in one or more embodiments of the present invention.

Figure 6:
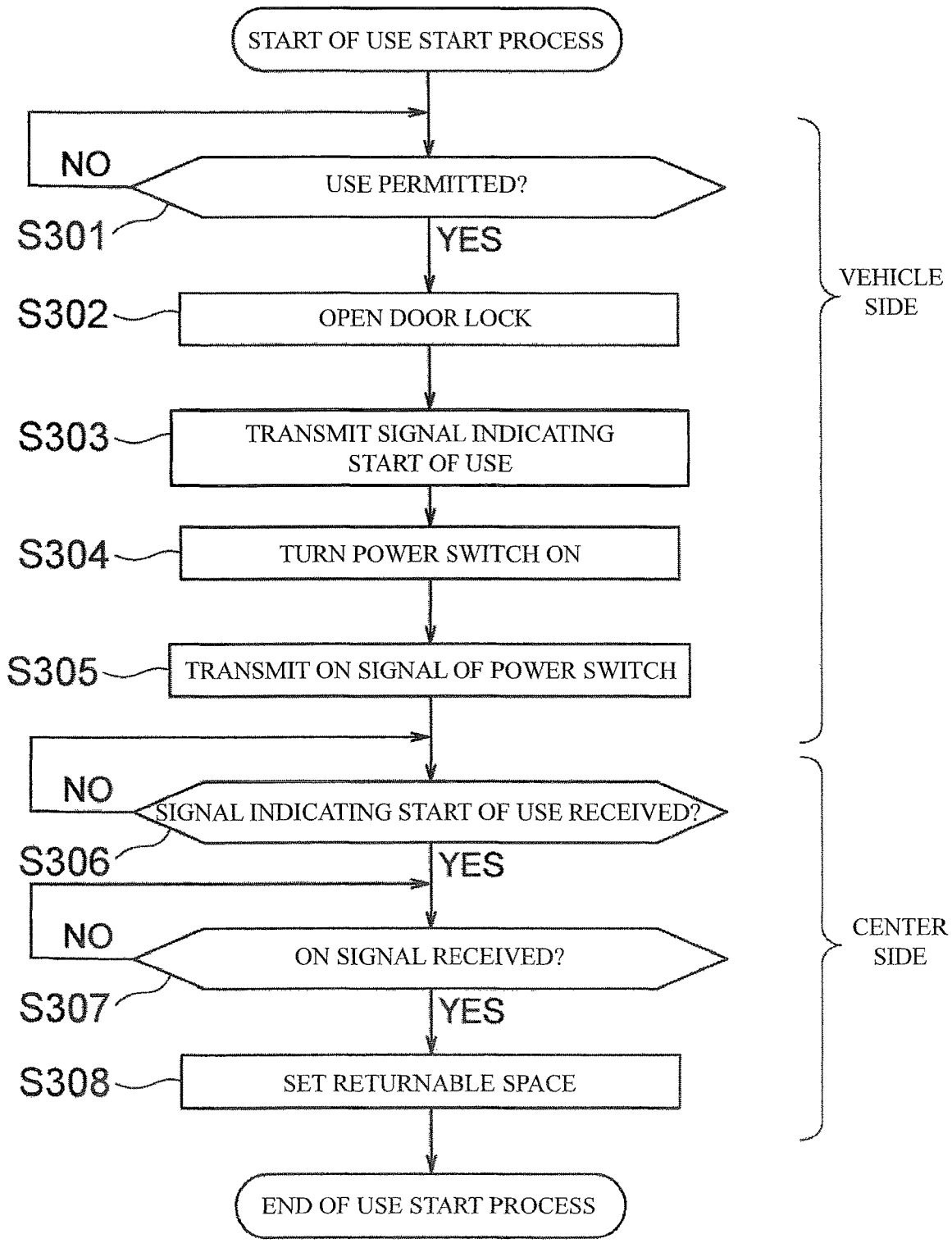
FIG. 6 is a flowchart illustrating a process executed when starting the use of a vehicle in one or more embodiments of the present invention.

FIG. 6 is a flowchart that illustrates an example of the processes executed when starting the use of a shared vehicle 200 in a vehicle management system according to one or more embodiments of the present invention. Here, the vehicle transmits a signal indicating ON of a power switch to the server and that the management server 100 sets, on the basis of the ON signal of the power switch, the vacant parking space in which the reserved vehicle is parked at the time of departure, to a returnable space.

The user turns the power switch of the shared vehicle 200 from an OFF state to an ON state so that the shared vehicle 200 travels. When the shared vehicle 200 is an electric vehicle, for example, the power switch is a switch for activating the driving system of the vehicle. When the shared vehicle 200 is a vehicle including only the engine for the power source, an ignition switch corresponds to the power switch.

When the power switch is turned from the OFF state to the ON state, the onboard device 210 uses the communication unit 220 to transmit a signal indicating the ON state of the power switch (referred to as an "ON signal" hereinafter) to the management server 100. The ON signal of the power switch is also a signal indicating that the vehicle will start to travel.

When using the vehicle, the user first uses the user terminal 400 to perform an authenticating process with the onboard device 210 of the shared vehicle 200 for opening the lock mechanism of the doors. The user then gets in the vehicle and turns the power switch to the ON state. Therefore, from the shared vehicle 200 to the management server 100, a signal indicating the start of use is first transmitted and the ON signal of the power switch is then transmitted.

The control unit 110 of the management server 100 uses the communication unit 120 to receive the signal indicating the start of use and thereafter determines whether or not the ON signal of the power switch is received. When the ON signal of the power switch is received after the signal indicating the start of use is received, the return space setting unit 12 of the control unit 110 sets a vacant parking space to a returnable space. The vacant parking space is the parking space in which the reserved vehicle is parked at the time of departure.

Next, the processes according to one or more embodiments of the present invention will be described below. FIG. 6 is a flowchart that illustrates an example of the processes executed when starting the use of a shared vehicle 200 in one or more embodiments of the present invention. In the processes of steps S301 to S308, the processes of steps S301 to S305 represent the processes executed at the side of the shared vehicle 200 while the processes of steps S306 and S307 represent the processes executed at the side of the server.

The processes of steps S301 to S303 are similar to the processes of steps S101 to S103 (see FIG. 4) set forth above and, therefore, the description will be omitted.

In step S304, the power switch is turned to the ON state by the user operation. In step S305, the onboard device 210 uses the communication unit 220 to transmit the ON signal of the power switch to the management server 100.

In step S306, the control unit 110 of the management server 100 uses the usage determining unit 16 to determine whether or not the communication unit 120 receives the signal indicating the start of use of the shared vehicle 200. When the communication unit 120 receives the signal indicating the start of use of the shared vehicle 200, the process proceeds to step S307. When the communication unit 120 does not receive the signal indicating the start of use of the shared vehicle, the process of the usage determining unit 16 waits in step S306 while the usage determining unit 16 determines that the use of the shared vehicle 200 is not started.

In step S307, the control unit 110 of the management server 100 uses the return space setting unit 12 to determine whether or not the communication unit 120 receives the ON signal of the power switch. When the communication unit 120 receives the ON signal of the power switch, the process proceeds to step S308. When the communication unit 120 does not receive the ON signal of the power switch, the process of the return space setting unit 12 waits in step S307 while the return space setting unit 12 determines that the shared vehicle (reserved vehicle) 200 does not travel from the parking space.

In step S308, the control unit 110 of the management server 100 uses the return space setting unit 12 to acquire the information. The acquired information includes information of the shared vehicle 200 used by user when starting the use of the shared vehicle 200 and the information indicating that the vehicle travels from the parking space. The return space setting unit 12 sets the parking space in which the shared vehicle 200 is parked, to a returnable space.

As above, t in one or more embodiments of the present invention, the vehicle management system sets the parking space in which the reserved vehicle is parked to a returnable space when detecting that the reserved vehicle starts to travel after receiving the signal indicating the start of use of the reserved vehicle. In this way, the management server can perceive the timing when the use of the reserved vehicle is started and the reserved vehicle starts to travel from the parking space. It is possible to reduce the occupation time for the parking space.

In one or more embodiments of the present invention, a signal indicating the accelerator position of the shared vehicle 200, for example, may also be transmitted and received so as to indicate that the vehicle travels from the parking space instead of the ON signal of the power switch.

Figure 7:
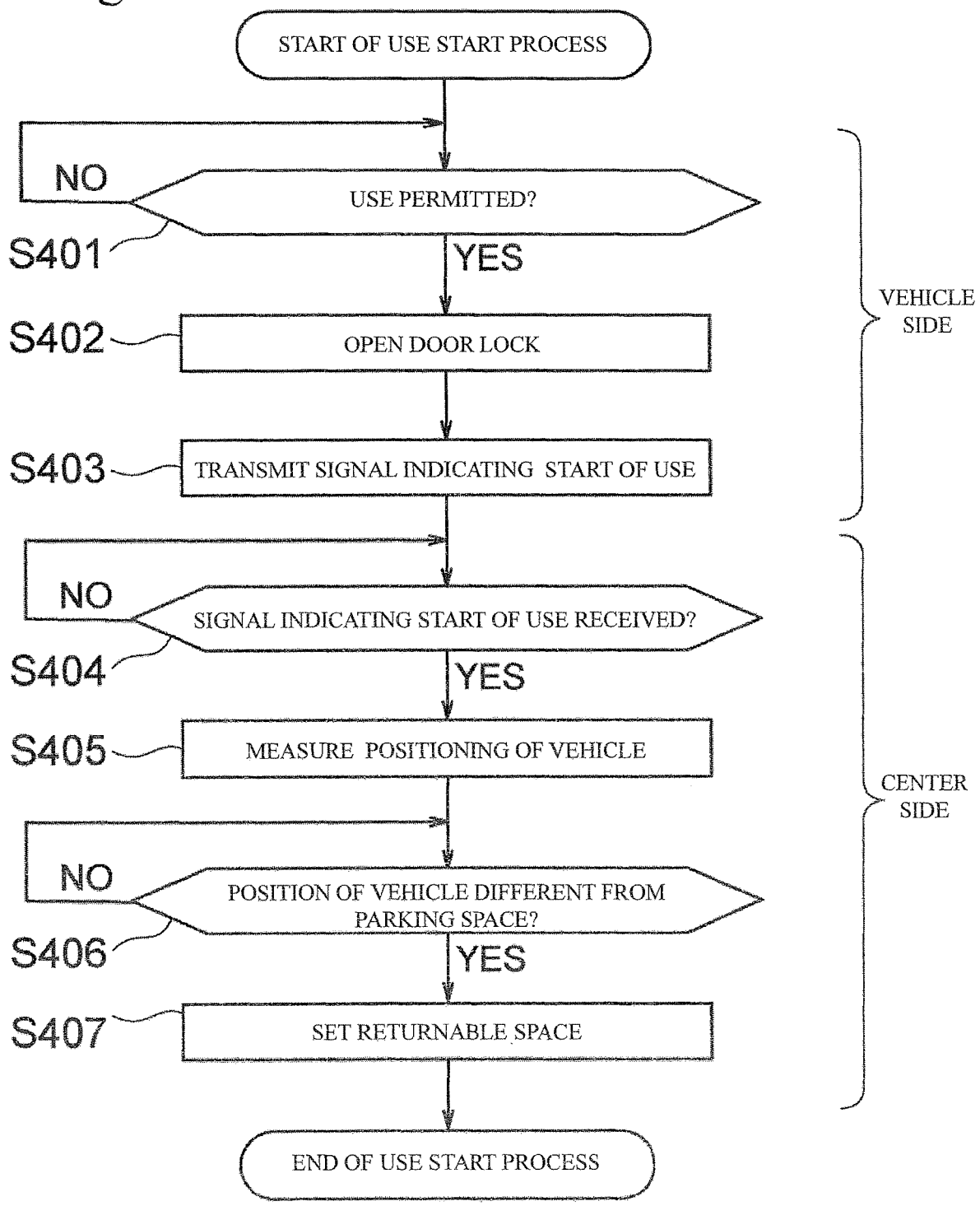
FIG. 7 is a flowchart illustrating a process executed when starting the use of a vehicle in one or more embodiments of the present invention.

FIG. 7 is a flowchart that illustrates an example of the processes executed when starting the use of a shared vehicle 200 in a vehicle management system according to one or more embodiments of the present invention. One or more embodiments of the present invention includes positioning a vehicle and setting, on the basis of the position of the vehicle, the vacant parking space in which the reserved vehicle is parked at the time of departure to a returnable space.

The control unit 110 of the management server 100 acquires the positional information of the shared vehicle (reserved vehicle) 200 so as to detect the position of the reserved vehicle. The positional information of the shared vehicles 200 is acquired by using such as GPS. The control unit 110 then determines, on the basis of the acquired information, whether or not the position of the reserved vehicle is different from the position at which the reserved vehicle is parked at the time of departure. When the position of the reserved vehicle is different from the position at which the reserved vehicle is parked at the time of departure, the reserved vehicle is no longer parked in the parking space, and therefore the return space setting unit 12 sets the vacant parking space to a returnable space. The vacant parking space is the parking space in which the reserved vehicle is parked at the time of departure.

Next, the processes according to one or more embodiments of the present invention will be described below. FIG. 7 is a flowchart that illustrates an example of the processes executed when starting the use of a shared vehicle 200 in one or more embodiments of the present invention. In the processes of steps S401 to S407, the processes of steps S401 to S403 represent the processes executed at the side of the shared vehicle 200 while the processes of steps S404 to S407 represent the processes executed at the side of the server.

The processes of steps S401 to S403 are similar to the processes of steps S101 to S103 (see FIG. 4) set forth above and, therefore, the description will be omitted.

In step S404, the control unit 110 of the management server 100 uses the usage determining unit 16 to determine whether or not the communication unit 120 receives the signal indicating the start of use of the shared vehicle 200. When the communication unit 120 receives the signal indicating the start of use of the shared vehicle (reserved vehicle) 200, the process proceeds to step S405. When the communication unit 120 does not receive the signal indicating the start of use of the shared vehicle, the process waits in step S404.

In step S405, the control unit 110 of the management server 100 measures the position of the reserved vehicle on the basis of the positional information transmitted from the reserved vehicle. In step S406, the control unit 110 determines whether or not the position of the reserved vehicle is different from the position (parking position) at which the reserved vehicle is parked at the time of departure. When the measured position of the reserved vehicle is different from the position (parking position) at which the reserved vehicle is parked at the time of departure, the process proceeds to step S407. When the measured position of the reserved vehicle is the same as the position (parking position) at which the reserved vehicle is parked at the time of departure, the process of the usage determining unit 16 waits in step S406 while the usage determining unit 16 determines that the shared vehicle does not travel from the parking space.

In step S407, the control unit 110 of the management server 100 uses the return space setting unit 12 to acquire the information of the shared vehicle 200 from the usage determining unit 16. The acquired information includes information of the shared vehicle 200 used by user when starting the use of the shared vehicle 200, and the information indicating that the position of the reserved vehicle is difference from the parking position. The return space setting unit 12 sets the parking space in which the shared vehicle 200 is parked, to a returnable space.

As above, here, the vehicle management system acquires the positional information of the vehicle from the shared vehicle 200 so as to detect the position of the reserved vehicle measured by GPS. After receiving the signal indicating the start of use of the reserved vehicle, the vehicle management system sets the vacant parking space to a returnable space, when the position of the reserved vehicle is different from the position at which the reserved vehicle is parked. The vacant parking space is the parking space in which the reserved vehicle is parked at the time of departure. In this way, the management server can perceive the timing when the use of the reserved vehicle is started and the reserved vehicle starts to travel from the parking space. It is possible to reduce the occupation time for the parking space.

Figure 8:
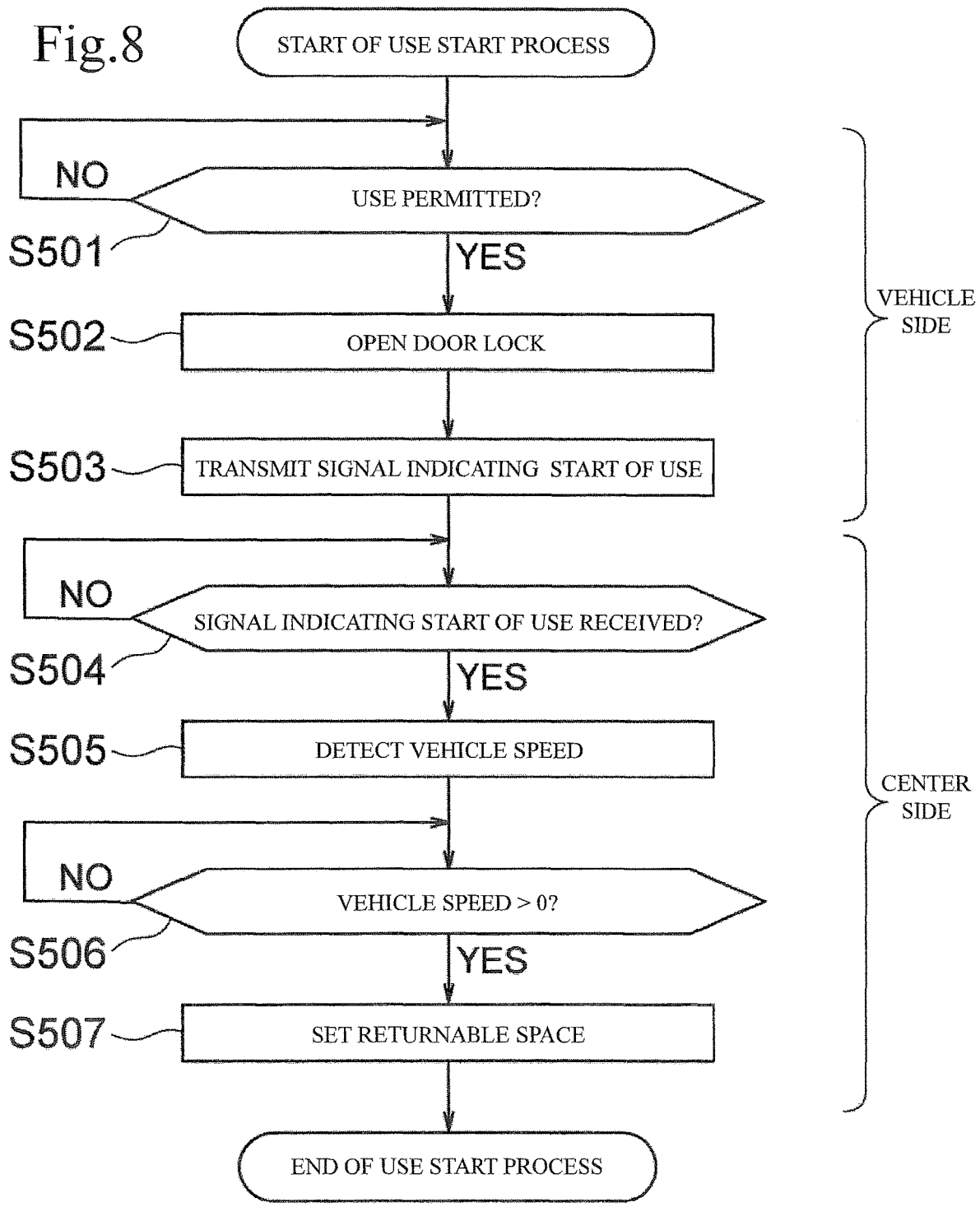
FIG. 8 is a flowchart illustrating a process executed when starting the use of a vehicle in one or more embodiments of the present invention.

FIG. 8 is a flowchart that illustrates an example of the processes executed when starting the use of a shared vehicle 200 in a vehicle management system according to one or more embodiments of the present invention. One or more embodiments of the present invention includes setting, on the basis of the vehicle speed of the reserved vehicle, the vacant parking space in which the reserved vehicle is parked at the time of departure, to a returnable space.

The control unit 110 of the management server 100 uses the communication unit 120 to receive the signal indicating the start of use of the shared vehicle 200 and then acquires information of the vehicle speed from the shared vehicle (reserved vehicle) 200. The acquired information indicates the vehicle speed of the shared vehicle 200 used by user when starting the use of the shared vehicle 200. The control unit 110 determines whether or not the vehicle speed of the reserved vehicle is larger than zero on the basis of the acquired vehicle speed information. When the vehicle speed of the reserved vehicle is larger than zero, the reserved vehicle is no longer parked in the parking space in which the reserved vehicle is parked. The return space setting unit 12 sets the vacant parking space to a returnable space. The vacant parking space is the parking space in which the reserved vehicle is parked at the time of departure.

Next, the processes according to one or more embodiments of the present invention will be described with reference to FIG. 8. In the processes of steps S501 to S507, the processes of steps S501 to S503 represent the processes executed at the side of the shared vehicle 200 while the processes of steps S504 to S507 represent the processes executed at the side of the server.

The processes of steps S501 to S504 are similar to the processes of steps S401 to S404 (see FIG. 7) set forth above and, therefore, the description will be omitted.

In step S505, the control unit 110 of the management server 100 detects the vehicle speed of the reserved vehicle on the basis of the vehicle speed information transmitted from the reserved vehicle. In step S506, the control unit 110 determines whether or not the vehicle speed of the reserved vehicle is larger than zero. When the vehicle speed of the reserved vehicle is larger than zero, the process proceeds to step S507. When the vehicle speed of the reserved vehicle is zero, the process of the usage determining unit 16 waits in step S506 while the usage determining unit 16 determines that the shared vehicle does not travel from the parking space.

In step S507, the control unit 110 of the management server 100 uses the return space setting unit 12 to acquire the information from the usage determining unit 16. The acquired information include information of the shared vehicle 200 used by the user when starting the use of the shared vehicle 200 and the information indicating that the vehicle speed of the reserved vehicle is larger than zero. The return space setting unit 12 sets the parking space in which the shared vehicle 200 is parked, to a returnable space.

As above, here, the vehicle management system acquires the vehicle speed information of the vehicle from the shared vehicle 200 and detects the vehicle speed of the reserved vehicle. The vehicle management system sets the parking space in which the reserved vehicle is parked to a returnable space when the vehicle speed of the reserved vehicle is larger than zero after receiving the signal indicating the start of use of the reserved vehicle. In this way, the management server can perceive the timing when the use of the reserved vehicle is started and the reserved vehicle starts to travel from the parking space. It is possible to reduce the occupation time for the parking space.

Figure 9:
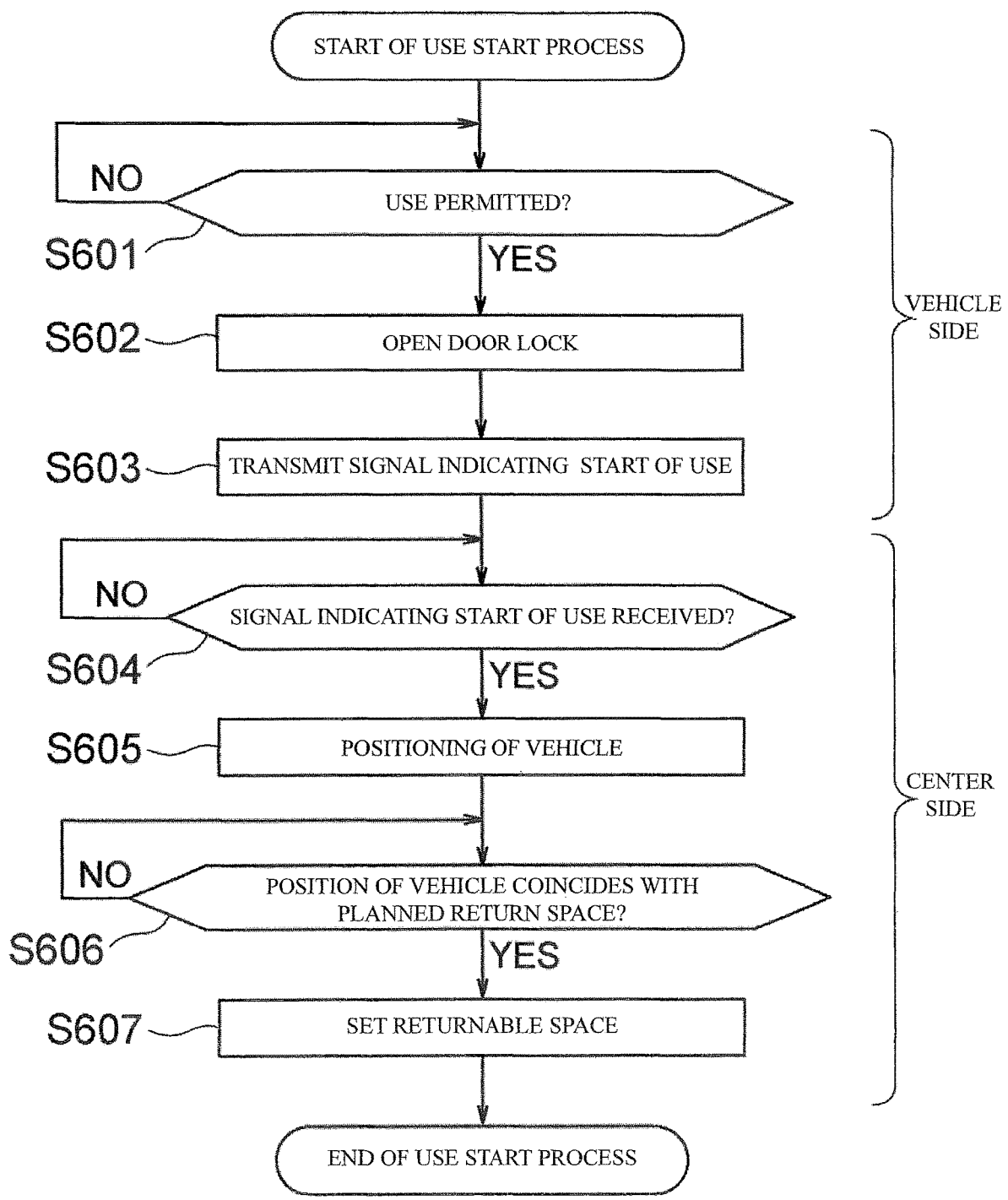
FIG. 9 is a flowchart illustrating a process executed when starting the use of a vehicle in one or more embodiments of the present invention.

FIG. 9 is a flowchart that illustrates an example of the processes executed when starting the use of a shared vehicle 200 in a vehicle management system according to one or more embodiments of the present invention. One or more embodiments of the present invention includes setting, when the position of the reserved vehicle coincides with a planned return space, the vacant parking space in which the reserved vehicle is parked at the time of departure, to a returnable space.

The control unit 110 of the management server 100 uses the communication unit 120 to receive the signal indicating the start of use of the shared vehicle 200. The control unit 110 acquires the positional information from the shared vehicle (reserved vehicle) 200 after receiving the signal. The position information indicates a position of the vehicle used by the user when starting the use of the shared vehicle 200. The control unit 110 determines whether or not the position of the reserved vehicle coincides with the planned return space on the basis of the acquired positional information. When the position of the reserved vehicle coincides with the planned return space, the reserved vehicle is no longer parked in the parking space in which the reserved vehicle is parked. The return space setting unit 12 sets the vacant parking space to a returnable space. The vacant parking space is the parking space in which the reserved vehicle is parked at the time of departure.

Next, the processes according to one or more embodiments of the present invention will be described with reference to FIG. 9. In the processes of steps S601 to S607, the processes of steps S601 to S603 represent the processes executed at the side of the shared vehicle 200 while the processes of steps S604 to S607 represent the processes executed at the side of the server.

The processes of steps S601 to S605 are similar to the processes of steps S401 to S405 (see FIG. 7) set forth above and, therefore, the description will be omitted.

In step S606, the control unit 110 determines whether or not the position of the reserved vehicle coincides with the planned return space. When the position of the reserved vehicle coincides with the planned return space, the return determining unit 14 of the control unit 110 determines that the reserved vehicle has been returned to the planned return space, and the process proceeds to step S607. When the position of the reserved vehicle does not coincide with the planned return space, the process waits in step S606.

In step S607, the control unit 110 of the management server 100 uses the return space setting unit 12 to acquire the information from the usage determining unit 16. The acquired information indicates information of the shared vehicle 200 used by user when starting the use of the shared vehicle 200 and the information indicating that the position of the reserved vehicle coincides with the planned return space. The return space setting unit 12 sets the parking space in which the shared vehicle 200 is parked, to a returnable space.

As above, here, the vehicle management system receives the signal indicating the start of use of the reserved vehicle. The vehicle management system sets the vacant parking space to a returnable space when determining that the reserved vehicle returns to the planned return space after receiving the signal indicating the start of use of the reserved vehicle. The vacant parking space is the parking space in which the reserved vehicle is parked at the time of departure. In this way, the management server can perceive the timing when the use of the reserved vehicle is started and the reserved vehicle is returned to the planned return space. It is possible to reduce the occupation time for the parking space.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

11 Vehicle setting unit
12 Return space setting unit
13 Reservation managing unit
14 Return determining unit
15 Return permitting unit
16 Usage determining unit
100 Management server
110 Control unit
120 Communication unit
200 Shared vehicle
400 User terminal

The invention claimed is:

1. A vehicle management system for managing vehicles used by a plurality of users, the vehicle management system comprising:
   a management server comprising a computer processor, wherein the management server is configured to:
      accept a reservation for use of one of the vehicles from a first terminal operated by a first user of the plurality of users;
      store parking space information and identification information of the vehicles in a database, wherein the parking space information and the identification information of the vehicles are associated with each other;
      communicate with the first terminal and the vehicles;
      receive reservation information on a reserved vehicle;
      receive a first signal indicating that the reserved vehicle is activated and including identification information of the reserved vehicle, wherein the first signal is directly transmitted from the reserved vehicle to the management server after a lock mechanism of the reserved vehicle is opened;
      upon determining that the reserved vehicle is activated based on the received first signal; compare the identification information stored in the database with the identification information of the reserved vehicle;
      specify a parking space corresponding to the identification information of the reserved vehicle,
      when a second signal is received indicating that a state of a power switch provided with the reserved vehicle changes from OFF to ON after receiving the first signal, set the specified parking space as a returnable space, transmit information of the returnable space to a second terminal operated by a second user, and cause display of the information of the returnable space on a display screen of the second terminal;
      wherein the second signal is directly transmitted from the reserved vehicle to the management server; and
      when the second signal is not received, maintain the specified parking space as a non-returnable space.

2. The vehicle management system according to claim 1, wherein when the second signal is not received, the management server sets the specified parking space to the returnable space when a predetermined time has passed from a moment when the first signal indicating that the reserved vehicle is activated is received.

3. The vehicle management system according to claim 1, wherein the management server is further configured to:
   detect a movement of the reserved vehicle on a basis of vehicle information of the reserved vehicle, the vehicle information being transmitted from the reserved vehicle; and
   when the second signal is not received, set the specified parking space to the returnable space when detecting travel start of the reserved vehicle after receiving the first signal indicating that the reserved vehicle is activated, the first signal being received from the reserved vehicle.

4. The vehicle management system according to claim 1, wherein the management server is further configured to:
   detect a position of the reserved vehicle by a GPS positioning; and
   when the second signal is not received, set the specified parking space to the returnable space when detecting that the position of the reserved vehicle is different from a parking position after receiving the first signal indicating that the reserved vehicle is activated, wherein the parking position is a position at which the reserved vehicle is parked at a time of departure.

5. The vehicle management system according to claim 1, wherein the management server is further configured to:
   acquire information of a vehicle speed of the reserved vehicle from the reserved vehicle, and
   when the second signal is not received, set the specified parking space to the returnable space when detecting that the vehicle speed is larger than zero after receiving the first signal indicating that the reserved vehicle is activated, the first signal being received from the reserved vehicle.

6. The vehicle management system according to claim 1, wherein the management server is further configured to:
   determine that the reserved vehicle is returned to a planned return space set by the management server, and
   when the second signal is not received, set the specified parking space to the returnable space after receiving the first signal indicating that the reserved vehicle is activated and determining that the reserved vehicle is returned to the planned return space.

7. A vehicle management method executed by a management server, that communicates with vehicles for managing the vehicles used by a plurality of users, the vehicle management method comprising:
   accepting, using one or more processors, a reservation for use of one of the vehicles from a first terminal operated by a first user of the plurality of users;
   storing, using the one or more processors, parking space information and identification information of the vehicle in a database, the parking space information and the identification information being associated with each other;
   communicating, using the one or more processors, with the first terminal and the vehicles;
   receiving, using the one or more processors, reservation information on a reserved vehicle;
   receiving, using the one or more processors, a first signal indicating that the reserved vehicle is activated and including identification information of the reserved vehicle, wherein the first signal is directly transmitted from the reserved vehicle to the management server after a lock mechanism of the reserved vehicle is opened;
   upon determining that the reserved vehicle is activated based on the received first signal, comparing, using the one or more processors, the identification information stored in the database with the identification information of the reserved vehicle;
   specifying, using the one or more processors, a parking space corresponding to the identification information of the reserved vehicle;
   when a second signal is received indicating that a state of a power switch provided with the reserved vehicle changes from OFF to ON after receiving the first signal, using the one or more processors, setting the specified parking space as a returnable space, transmitting information of the set returnable space to a second terminal operated by a second user, and causing display of the information of the returnable space on a display screen of the second terminal; and
   wherein the second signal is directly transmitted from the reserved vehicle to the management server.

* * * * *